United States Patent
Kato

(10) Patent No.: US 10,052,771 B2
(45) Date of Patent: Aug. 21, 2018

(54) JOINT DEVICE FOR ROBOT

(71) Applicant: DENSO WAVE INCORPORATED, Chita-gun, Aichi-pref. (JP)

(72) Inventor: Yusuke Kato, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 12 days.

(21) Appl. No.: 15/340,739

(22) Filed: Nov. 1, 2016

(65) Prior Publication Data

US 2017/0136630 A1     May 18, 2017

(30) Foreign Application Priority Data

Nov. 16, 2015    (JP) ................................. 2015-224205

(51) Int. Cl.
    *B25J 17/00*        (2006.01)
    *F16H 1/02*         (2006.01)

(52) U.S. Cl.
    CPC ................ *B25J 17/00* (2013.01); *F16H 1/02* (2013.01); *Y10S 901/23* (2013.01); *Y10S 901/25* (2013.01)

(58) Field of Classification Search
    CPC ............ B25J 17/00; B25J 19/007; F16H 1/02
See application file for complete search history.

(56) References Cited

U.S. PATENT DOCUMENTS

| | | | | |
|---|---|---|---|---|
| 2009/0178506 A1* | 7/2009 | Yamamoto | ............... | B25J 9/102 74/490.03 |
| 2015/0068348 A1* | 3/2015 | Kirihara | ................... | B25J 17/02 74/490.03 |
| 2016/0114479 A1* | 4/2016 | Rosheim | ................ | B25J 9/0075 74/490.03 |
| 2016/0136823 A1* | 5/2016 | Choi | ..................... | G01M 3/005 74/490.03 |
| 2017/0120458 A1* | 5/2017 | Akaha | ...................... | B25J 18/04 |

FOREIGN PATENT DOCUMENTS

| JP | 2002-239966 A | | 8/2002 | |
|---|---|---|---|---|
| JP | 2002239966 A | * | 8/2002 | ............. B25J 17/00 |

* cited by examiner

*Primary Examiner* — Zakaria Elahmadi
(74) *Attorney, Agent, or Firm* — Oliff PLC

(57) ABSTRACT

A joint device for a robot includes a first frame, a motor fixed to the first frame, a flange rotated by the motor, and a second frame fixed to the flange. The first frame has an opening extending from a part of a lateral portion to a predetermined part of a bottom portion. An outer rim portion of the flange faces to the opening in the predetermined part. The outer rim portion has through-holes. An end portion of the second frame adjacent to the first frame includes a facing portion that faces to the outer rim portion, and screw holes provided on the facing portion. The flange is fixed to the second frame such that screws inserted into the respective through-holes are fastened to the respective screw holes of the second frame.

4 Claims, 5 Drawing Sheets

JOINT DEVICE FOR ROBOT

CROSS REFERENCE TO RELATED APPLICATION

This application is based on and incorporates herein by reference Japanese Patent Application No. 2015-224205 filed on Nov. 16, 2015.

TECHNICAL FIELD

The present disclosure relates to a joint device for a robot, connecting a first arm and a second arm rotatably.

BACKGROUND

Conventionally, a joint device for a robot includes a first arm having a window on a side surface of a frame, and a second arm fixed to a flange disposed inside the first arm. A worker inserts a bolt into the first arm through the window to fix a frame of the second arm to the flange by the bolt (e.g. Patent Document 1: JP 2002-239966 A).

In Patent Document 1, the fixed position of the bolt is adjacent to the center of the frame of the first arm. Hence, workability in assembling of the joint device through the window on the side surface of the frame may be low.

SUMMARY

It is an object of the present disclosure to provide a joint device for a robot in which workability in assembling of the joint device can be improved.

According to an aspect of the present disclosure, a joint device is used for a robot. The joint device includes a first frame having a circular cylindrical shape including a lateral portion and a bottom portion, a motor fixed to the first frame, a flange having a circular plate shape or a circular cylindrical shape and being rotated by the motor, and a second frame having a circular cylindrical shape and being fixed to the flange. The first frame has an opening extending from a part of the lateral portion to a predetermined part of the bottom portion. An outer rim portion of the flange faces to the opening in the predetermined part. The outer rim portion has through-holes. An end portion of the second frame adjacent to the first frame includes a facing portion that faces to the outer rim portion, and screw holes provided on the facing portion. The flange is fixed to the second frame such that screws inserted into the respective through-holes are fastened to the respective screw holes of the second frame.

According to the above configurations, the first frame has the circular cylindrical shape including the lateral portion and the bottom portion. The motor is fixed to the first frame. The flange having the circular plate shape or the circular cylindrical shape is rotated by the motor. The second frame having the circular cylindrical shape is fixed to the flange. More specifically, the flange has the through-holes. The end portion of the second frame adjacent to the first frame includes the screw holes. The flange is fixed to the second frame such that screws inserted into the respective through-holes are fastened to the respective screw holes of the second frame. Therefore, rotation of the motor cause rotation of the second frame fixed to the flange.

The through-holes are provided in the outer rim portion of the flange. The screw holes are formed on the facing portion of the second frame that faces to the outer rim portion of the flange. The first frame has the opening extending from a part of the lateral portion to the predetermined portion of the bottom portion. The outer rim portion of the flange faces to the opening in the predetermined portion of the bottom portion of the first frame. Hence, the screws can be easily inserted into the through-holes formed in the outer rim portion of the flange through the opening of the first frame. When the through-holes do not face to the opening, the through-holes can be made to face to the opening by rotation of the flange by the motor. Further, the opening extends to the predetermined portion of the bottom portion of the first frame. Thus, a tool for fastening the screws can be inserted and used through the bottom portion. Consequently, in the joint device for a robot, assembling workability can be improved.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
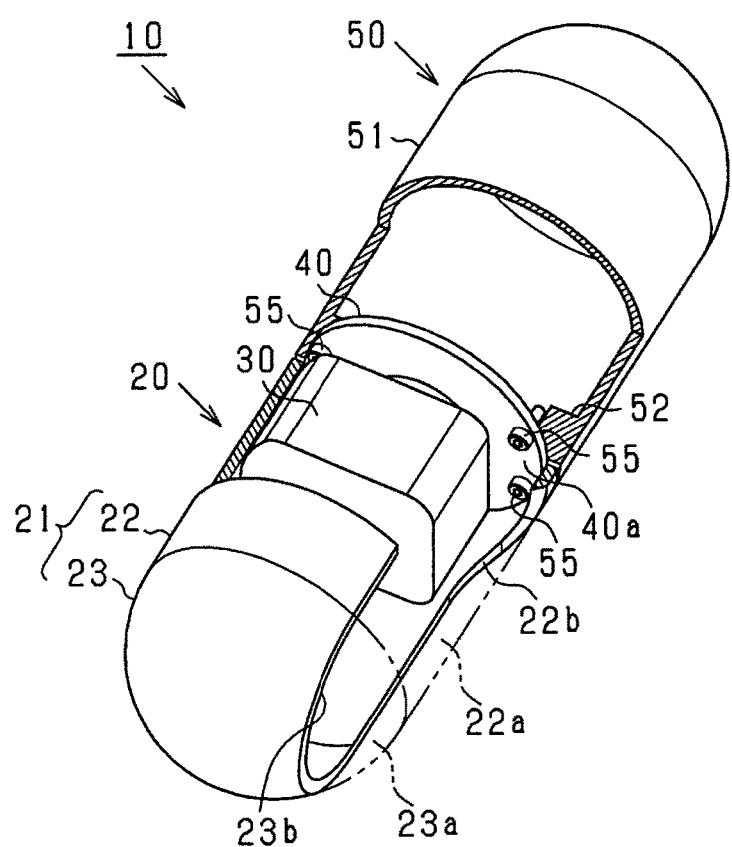
FIG. 1 is a perspective view showing a joint device for a robot in which a part of the joint device is cut out, according to an exemplar embodiment of the present disclosure.

An exemplar embodiment of the present disclosure will be described with reference to the drawings. The present embodiment is applied to a joint device of a multi-jointed robot connecting a first arm and a second arm rotatably. As shown in FIG. 1, a joint device 10 for a robot includes a first arm 20 and a second arm 50. The first arm 20 is connected to another arm of the robot. The second arm 50 is connected to anther arm or a hand.

The first arm 20 includes a first frame 21, a motor unit 30 and a flange 40.

Figure 3:
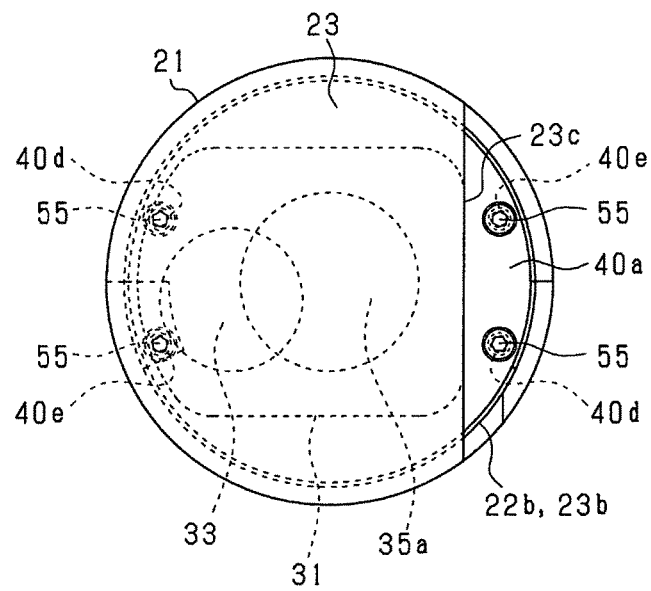
FIG. 3 is a view showing the joint device viewed in its axial direction, according to the exemplar embodiment.

The first frame 21 is formed into a circular cylindrical shape having a lateral portion 22 and a bottom portion 23. The first frame 21 has openings 22b and 23b which extend from a part 22a of the lateral portion 22 to a predetermined part 23a of the bottom portion 23. The opening 22b (i.e. cutout part 22a) extends in an axial direction of the first frame 21 from a position near to an edge of the lateral portion 22 adjacent to the second arm 50 to an opposite edge of the lateral portion 22 adjacent to the bottom portion 23 while the opening 22b has a predetermined width. The opening 23b (i.e. cutout predetermined part 23a) directly communicates with the opening 23b. The opening 23b extends in the axial direction of the first frame 21 from the edge of the bottom portion 23 adjacent to the lateral portion 22 to an opposite end of the bottom portion 23 while the opening 23b has the same width as the opening 22b of the lateral portion 22. The openings 22b and 23b have an oval shape as a whole. As shown in FIG. 3, the openings 22b and 23b are provided by cutting out a part of the first frame 21 located on an outer side of a predetermined chord 23c of the bottom portion 23.

Figure 2:
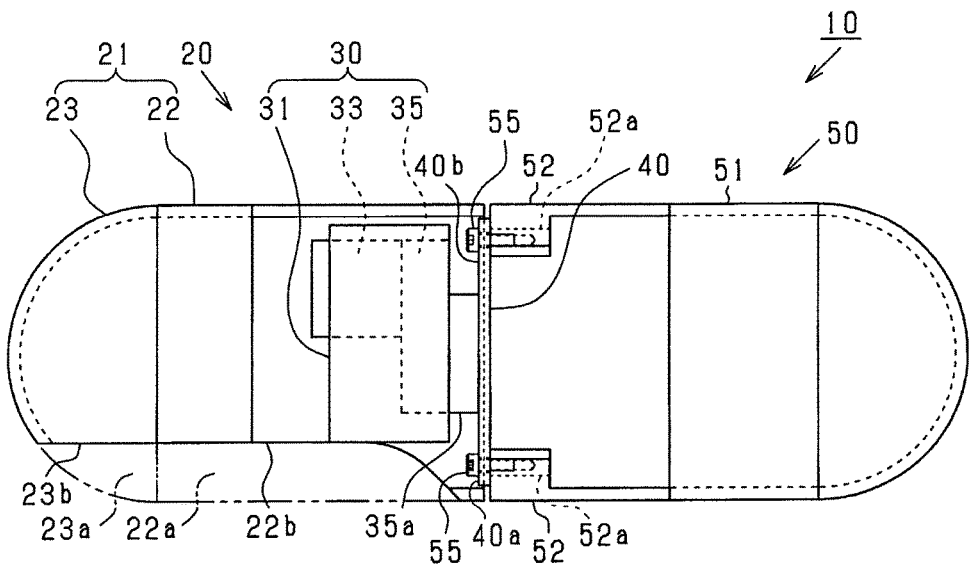
FIG. 2 is a side view showing the joint device in which a part of the joint device is cut out, according the exemplar embodiment.

As shown in FIG. 2, the motor unit 30 includes a housing 31, a motor 33, and a reducer 35. The motor 33 and the reducer 35 are attached to the housing 31. The reducer 35 decelerates rotation of the motor 33 and transmits the rotation to the flange 40. The housing 31 is fixed to the first frame 21.

The flange 40 is attached to an output shaft 35a of the reducer 35. Accordingly, the flange 40 is rotated by the motor 33 through the reducer 35. The flange 40 has a circular plate shape. A diameter of the flange 40 is slightly smaller than an inner diameter of the lateral portion 22 of the first frame 21. That is, a predetermined clearance (i.e. gap) is provided between an inner peripheral surface of the lateral portion 22 of the first frame 21 and an outer circumferential surface of the flange 40. The output shaft 35a of the reducer 35 is disposed at a center of the flange 40.

An outer rim portion 40a of the flange 40 faces to the opening 23b in the predetermined part 23a of the bottom portion 23. In other words, the openings 22b and 23b are formed in a projection area of the first frame 21 obtained by projecting a part of the outer rim portion 40a of the flange 40 on the first frame 21 in the axial direction of the first frame 21, as shown in FIG. 3. The outer rim portion 40a of the flange 40 has a pair of through-holes 40d and a pair of through-holes 40e. The pair of through-holes 40d corresponding to first through-holes are located on opposite end parts of the flange 40 in a diametrical direction. Similarly, the pair of through-holes 40e corresponding to second through-holes are located on opposite end parts of the flange 40 in another diametrical direction. One of the through-holes 40d and one of the through-holes 40e are located within an area of the outer rim portion 40a where both the one of the through-holes 40d and the one of the through-holes 40e are capable of facing to the opening 23b in the predetermined part 23a of the bottom portion 23. In other words, the one of the through-holes 40d and the one of the through-holes 40e are located within a projection area of the flange 40 obtained by projecting the opening 23b on the flange 40 in the axial direction of the first frame 21.

The motor 33 faces in the axial direction to a part 40b of an invisible area of the outer rim portion 40a of the flange 40 other than a visible area of the outer rim portion 40a facing to the opening 23b. In other words, the motor 33 is eccentric from the flange 40 toward the part 40b of the invisible area of the outer rim portion 40a. The invisible area of the outer rim portion 40a is invisible through the opening 23b in the predetermined part 23a of the bottom portion 23 when viewed in the axial direction of the first frame 21. The visible area of the outer rim portion 40a is visible through the opening 23b in the predetermined part 23a of the bottom portion 23 when viewed in the axial direction of the first frame 21.

The second arm 50 includes a second frame 51. The second frame 51 has a circular cylindrical shape. An end portion of the second frame 51 adjacent to the first frame 21 includes a facing portion 52 facing to the outer rim portion 40a of the flange 40, and multiple screw holes 52a provided on the facing portion 52. The screw holes 52a correspond to the respective through-holes 40d and 40e formed in the outer rim portion 40a of the flange 40. Screws 55 inserted into the respective through-holes 40d and 40e are fixed to the respective screw holes 52a. Therefore, the second frame 51 is fastened to the flange 40. In the present embodiment, the screws 55 are hexagon socket screws, for example.

Figure 4:
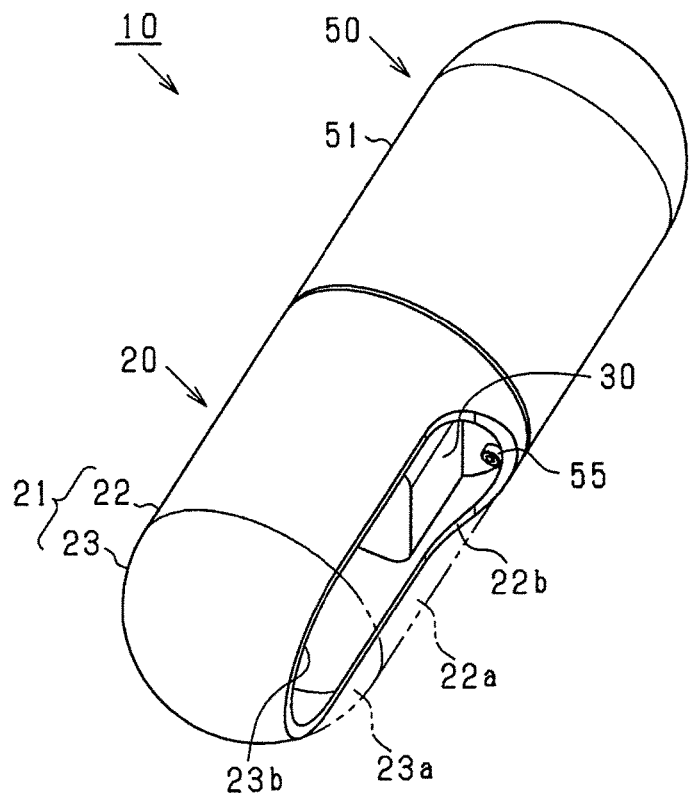
FIG. 4 is a perspective view showing the joint device before attaching of a cover, according to the exemplar embodiment.
Figure 5:
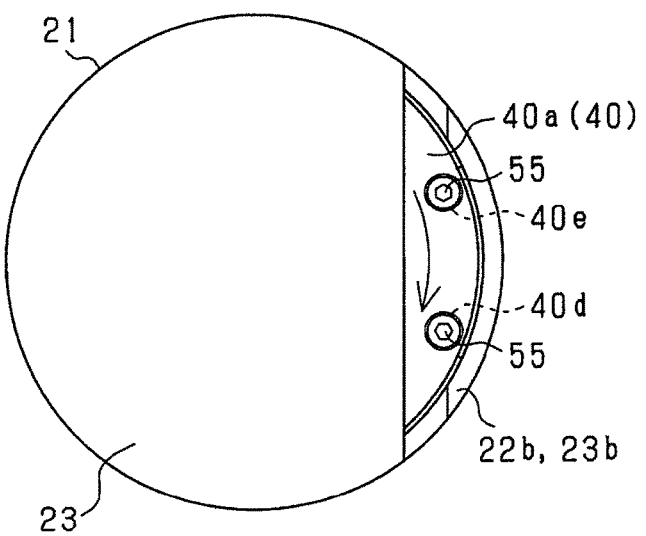
FIG. 5 is a view showing the joint device viewed in the axial direction before the attaching of the cover, according to the exemplar embodiment.
Figure 6:
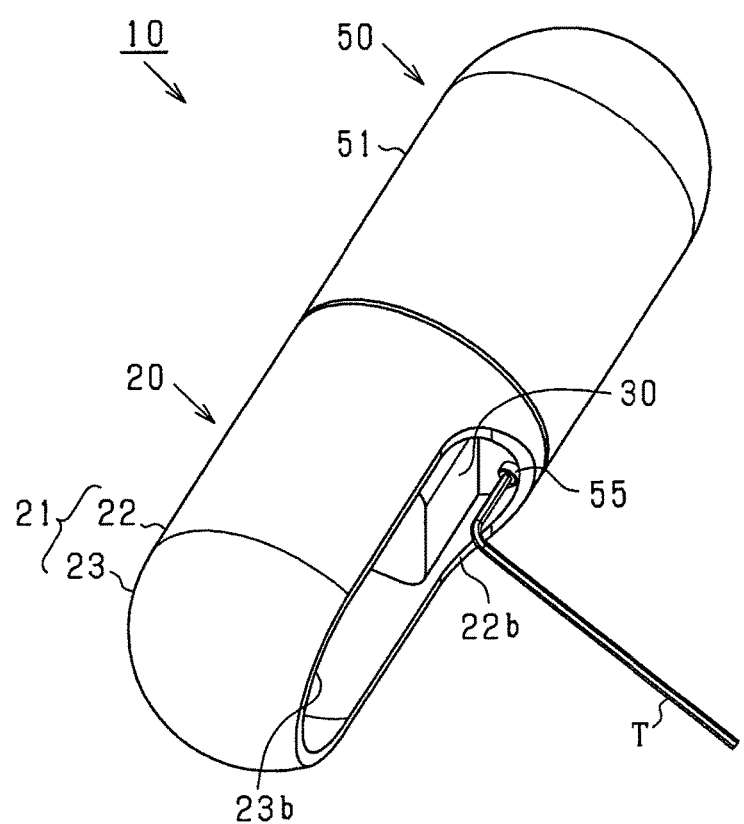
FIG. 6 is a perspective view showing the joint device into which a tool is inserted, according to the exemplar embodiment.
Figure 7:
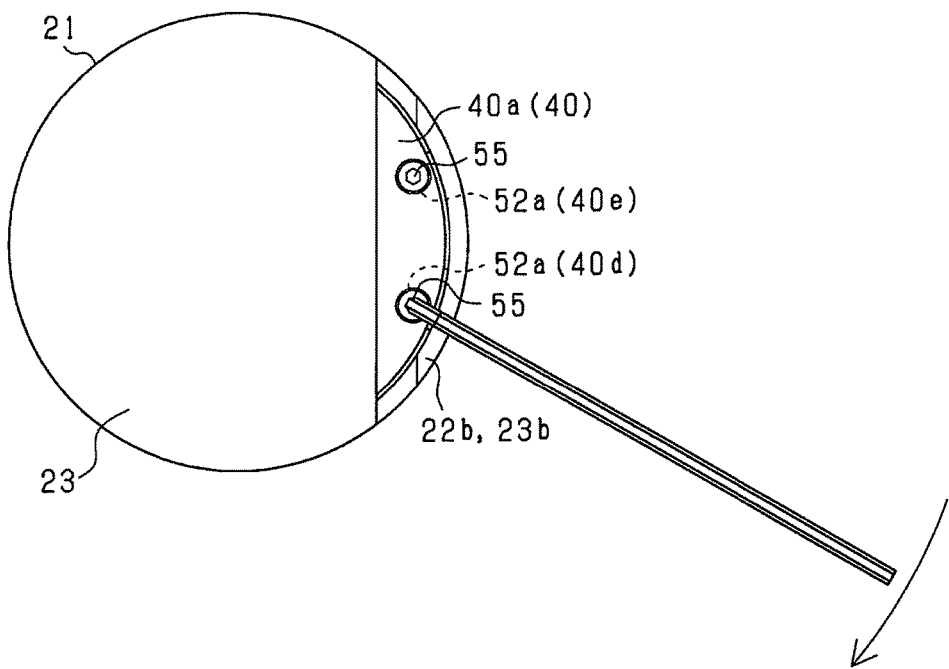
FIG. 7 is a view showing the joint device during screwing by the tool, according to the exemplar embodiment.
Figure 8:
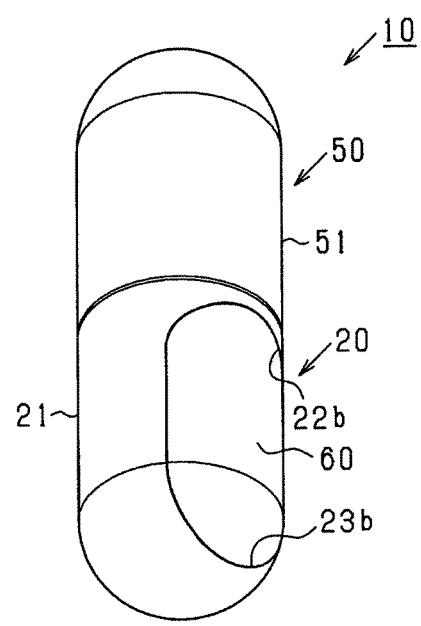
FIG. 8 is a perspective view showing the joint device after the attaching of the cover, according to the exemplar embodiment.

Hereinafter, an assembly process of the joint device 10 for a robot, i.e. a manufacturing method of the joint device 10 will be described. At first step, the motor unit 30 is fixed to the first frame 21. At second step, the flange 40 is attached to the output shaft 35a of the reducer 35. The first step and the second step may be reversed. At third step, a position of the second frame 51 relative to the flange 40 is fixed. For example, a pin is fitted into pin holes of the flange 40 and the second frame 51. At fourth step, as shown in FIG. 4, the screws 55 are inserted into the first frame 21 through the openings 22b and 23b of the first frame 21. At fifth step, the screws 55 are inserted into the through-holes 40d and 40e of the outer rim portion 40a of the flange 40. At this time, if the through-holes 40d and 40e do not face to the openings 22b and 23b, the flange 40 is, as shown in FIG. 5, rotated by the motor 33 such that the through-holes 40d and 40e face to the openings 22b and 23b. In other words, if the through-holes 40d and 40e are not visible through the openings 22b and 23b, the flange 40 is rotated to a position where the through-holes 40d and 40e are visible. At sixth step, as shown in FIG. 6, a hexagon wrench T (tool) is inserted into the first frame 21 through the openings 22b and 23b of the first frame 21. Then, the hexagon wrench T is fitted to a hexagon socket of the screw 55. A longer straight portion of an L-shaped hexagon wrench may be fitted to the hexagon socket of the screw 55. At seventh step, as shown in FIG. 7, the screw 55 is fastened to the screw hole 52a by rotation of the hexagon wrench T. At this time, the screws 55 are fastened to the screw hole 52a corresponding to the through-hole 40d and the screw hole 52a corresponding to the through-hole 40e, respectively. At eighth step, the flange 40 is rotated by 180 degrees by the motor 33, and operations of the above fifth to seventh steps are performed again. At ninth step, as shown in FIG. 8, a cover 60 is attached to the opening 22b and 23b.

The above-described embodiment possesses the following advantages.

The multiple through-holes 40d and 40e are formed in the outer rim portion 40a of the flange 40. The multiple screw holes 52a are formed in the facing portion 52 of the second frame 51 that faces to the outer rim portion 40a of the flange 40. The first frame 21 has the openings 22b and 23b extending from the part 22a of the lateral portion 22 to the predetermined part 23a of the bottom portion 23. The outer rim portion 40a of the flange 40 faces to the opening 23b. Thus, the screw 55 can be easily inserted into the through-holes 40d and 40e formed in the outer rim portion 40a of the flange 40 through the openings 22b and 23b of the first frame 21. Even when the through-holes 40d and 40e do not face the openings 22b and 23b, the through-holes 40d and 40e can be made to face the openings 22b and 23b by rotation of the flange 40 by the motor 33.

Since the openings 22b and 23b extend to the predetermined part 23a of the bottom portion 23 of the first frame 21, the hexagon wrench T can be inserted and used from the bottom portion 23 for fastening the screws. As a result, in the joint device 10 for a robot, assembling workability can be improved. Not only is the L-shaped hexagon wrench used, but an electrical straight hexagon wrench may be used. Not only is the hexagon socket screw used, but another type screw may be used.

As shown in FIG. 7, the screw 55 can be fastened at a position near to the opening 22b. Hence, a rotatable angle of the hexagon wrench T at once can be increased.

The rotation of the motor 33 is decelerated and transmitted to the flange 40 by the reducer 35. The output shaft 35a of the reducer 35 is located at the center of the flange 40. The motor 33 faces to the part 40b of the invisible area of the outer rim portion 40a of the flange 40 other than the visible area of the outer rim portion 40a facing to the opening 23b. Thus, a space adjacent to the part 40b of the invisible area of the outer rim portion 40a of the flange 40 can be used as a space in which the motor 33 is located. Hence, the diameter of the flange 40 can be reduced as compared to a case where the diameter of the flange 40 is enlarged to prevent the motor 33 from facing to the outer rim portion 40a of the flange 40. Accordingly, the joint device 10 for a robot can be reduced in physical size.

The openings 22b and 23b of the first frame 21 are formed by cutting out a part of the bottom portion 23 located on an outer side of the predetermined chord 23c when viewed in the axial direction. Therefore, the shape of the openings 22b and 23b can become simple, and manufacturing of the first frame 21 can be facilitated.

The multiple through-holes 40d and 40e consist of the pair of through-holes 40d provided on opposite end parts in a diametrical direction of the flange 40, and the pair of through-holes 40e provided on opposite end parts in another diametrical direction of the flange 40. One of the pair of the through-holes 40d and one of the pair of the through-holes 40e are located within the area of the flange 40 such that both the two through-holes 40d and 40e are capable of facing to the opening 23b in the predetermined part 23a. Thus, the screws 55 can be inserted and fastened through the through-hole 40d and the through-hole 40e in a state where both the two through-holes 40d and 40e face to the opening 23b in the predetermined part 23a. Further, by rotation of the motor 33, another of the pair of the through-holes 40d and another of the pair of the through-holes 40e can be made to face to the opening 23b in the predetermined part 23a, and the screws 55 can be fastened through the through-holes 40d and 40e similarly. Consequently, in the joint device 10 for a robot, the assembling workability can be further improved.

Although the present disclosure has been fully described in connection with the preferred embodiment thereof with reference to the accompanying drawings, it is to be noted that various changes and modifications will become apparent to those skilled in the art. The above-described embodiment may be modified and exploited as described below.

The through-holes 40d and 40e of the flange 40 may be arranged at regular intervals in the outer rim portion 40a. In this case, the screw holes 52a of the second frame 51 are also arranged at intervals corresponding to the through-holes 40d and 40e arranged at regular intervals. The flange 40 may have a circular cylindrical shape have a predetermined thickness in a radial direction of the flange 40.

The openings 22b and 23b may not be limited to the shape obtained by cutting out of a part of the bottom portion 23 located on an outer side of the predetermined chord 23c. The openings 22b and 23b may have a shape obtained by roundly or rectangularly cutting out of a rim part of the bottom portion 23

The motor unit 30 may not include the reducer 35, and the motor 33 may be arranged at the center of the flange 40. In this case, the motor 33 is arranged so as not to face to the outer rim portion 40a of the flange 40.

According to the above embodiment, the first frame has the circular cylindrical shape including the lateral portion and the bottom portion. The motor is fixed to the first frame. The flange having the circular plate shape or the circular cylindrical shape is rotated by the motor. The second frame having the circular cylindrical shape is fixed to the flange. More specifically, the flange has the through-holes. The end portion of the second frame adjacent to the first frame includes the screw holes. The flange is fixed to the second frame such that screws inserted into the respective through-holes are fastened to the respective screw holes of the second frame. Therefore, rotation of the motor cause rotation of the second frame fixed to the flange.

The through-holes are provided in the outer rim portion of the flange. The screw holes are formed on the facing portion of the second frame that faces to the outer rim portion of the flange. The first frame has the opening extending from the part of the lateral portion to the predetermined portion of the bottom portion. The outer rim portion of the flange faces to the opening in the predetermined portion of the bottom portion of the first frame. Hence, the screws can be easily inserted into the through-holes formed in the outer rim portion of the flange through the opening of the first frame. When the through-holes do not face to the opening, the through-holes can be made to face to the opening by rotation of the flange by the motor. Further, the opening extends to the predetermined portion of the bottom portion of the first frame. Thus, a tool for fastening the screws can be inserted and used through the bottom portion. Consequently, in the joint device for a robot, assembling workability can be improved.

The joint device may include the reducer decelerating rotation of the motor and transmits the rotation to the flange. The output shaft of the reducer may be arranged at the center of the flange. The motor may face to the part of the area of the outer rim portion of the flange other than the area of the outer rim portion facing to the opening in the predetermined part.

In this case, the rotation of the motor is decelerated and transmitted to the flange by the reducer. The output shaft of the reducer is arranged at the center of the flange. On the other hand, the motor faces to the part of the area of the outer rim portion of the flange other than the area of the outer rim portion facing to the opening in the predetermined part of the bottom portion of the first frame. Hence, the space adjacent to the part of the outer rim portion of the flange can be used as a space in which the motor is located. Therefore, the diameter of the flange can be reduced as compared to a case where the diameter of the flange is enlarged to prevent the motor from facing to the outer rim portion of the flange. Accordingly, the joint device for a robot can be reduced in physical size.

The opening may be a cutout part of the bottom portion located on the outer side of the predetermined chord of the bottom portion.

In this case, the opening of the first frame is formed by cutting out a part of the circular and cylindrical bottom portion of the first frame, i.e. a part of the circular-shaped bottom portion located on the outer side of the predetermined chord. Thus, the shape of the opening can be made to be simple, and the manufacturing of the first frame can be facilitated.

The through-holes may consist of the pair of first through-holes provided on opposite end parts of the flange in a diametrical direction of the flange, and the pair of second through-holes provided on opposite end parts of the flange in another diametrical direction of the flange. One of the pair of first through-holes and one of the pair of second through-holes may be located within an area where both the one of the pair of first through-holes and the one of the pair of second through-holes are capable of facing to the opening in the predetermined part.

In this case, the through-holes consist of the pair of first through-holes provided on opposite end parts of the flange in a diametrical direction of the flange, and the pair of second through-holes provided on opposite end parts of the flange in another diametrical direction of the flange. Further, one of the pair of first through-holes and one of the pair of second through-holes are located within an area where both the one of the pair of first through-holes and the one of the pair of second through-holes are capable of facing to the opening in the predetermined part. Hence, the screws can be inserted and fastened through the first through-hole and the second through-hole in a state where both the two through-holes face to the opening in the predetermined portion. Further, by rotation of the motor, another of the pair of the through-holes and another of the pair of the through-holed can be made to face to the opening in the predetermined portion, and the screws can be fastened through the through-holes similarly. Consequently, in the joint device for a robot, the assembling workability can be further improved.

Additional advantages and modifications will readily occur to those skilled in the art. The disclosure in its broader terms is therefore not limited to the specific details, representative apparatus, and illustrative examples shown and described.

What is claimed is:

1. A joint device for a robot, the joint device comprising:
   a first frame having a circular cylindrical shape including a lateral portion and a bottom portion;
   a motor fixed to the first frame;
   a flange having a circular plate shape or a circular cylindrical shape and being rotated by the motor; and
   a second frame having a circular cylindrical shape and being fixed to the flange, wherein
   the first frame has an opening extending from a part of the lateral portion to a predetermined part of the bottom portion,
   the predetermined part is located in an area of the bottom portion defined by extending a plane of a chord of the first frame to the bottom portion in an axial direction of the first frame,
   an outer rim portion of the flange faces to the opening in the predetermined part in the axial direction,
   the outer rim portion has through-holes,
   an end portion of the second frame adjacent to the first frame includes a facing portion that faces to the outer rim portion, and screw holes provided on the facing portion, and
   the flange is fixed to the second frame such that screws inserted into the respective through-holes are fastened to the respective screw holes of the second frame.

2. The joint device according to claim 1, further comprising a reducer decelerating rotation of the motor and transmits the rotation to the flange, wherein
   an output shaft of the reducer is arranged at a center of the flange, and
   the motor faces to a part of an area of the outer rim portion of the flange other than an area of the outer rim portion facing to the opening in the predetermined part.

3. The joint device according to claim 1, wherein the opening is a cutout part of the bottom portion located on an outer side of a predetermined chord of the bottom portion.

4. The joint device according to claim 1, wherein
   the through-holes consist of a pair of first through-holes provided on opposite end parts of the flange in a diametrical direction of the flange, and a pair of second through-holes provided on opposite end parts of the flange in another diametrical direction of the flange, and
   one of the pair of first through-holes and one of the pair of second through-holes are located within an area where both the one of the pair of first through-holes and the one of the pair of second through-holes are capable of facing to the opening in the predetermined part.

* * * * *